United States Patent [19]

Grabis

[11] Patent Number: 5,355,984
[45] Date of Patent: Oct. 18, 1994

[54] DAMPING DEVICE FOR A MULTIPLATE FRICTION CLUTCH

[75] Inventor: Thomas Grabis, Kirchardt, Fed. Rep. of Germany

[73] Assignee: Valeo, Paris, France

[21] Appl. No.: 60,578

[22] Filed: May 13, 1993

[30] Foreign Application Priority Data

May 14, 1992 [FR] France ............................ 92 05870

[51] Int. Cl.⁵ ............................................. F16D 13/68
[52] U.S. Cl. ................................ 192/70.17; 192/70.19; 192/106.2; 464/68
[58] Field of Search ............... 192/70.12, 70.19, 70.2, 192/106.2; 464/63, 64, 68

[56] References Cited

U.S. PATENT DOCUMENTS

| | | | |
|---|---|---|---|
| 3,534,841 | 10/1970 | Schneider et al. | 192/106.2 |
| 3,578,121 | 5/1971 | Maurice | 192/106.2 |
| 3,800,931 | 4/1974 | Maucher | 192/70.17 X |
| 4,177,888 | 12/1979 | Arrowsmith | 192/106.2 |
| 4,475,640 | 10/1984 | Takeuchi et al. | 192/70.17 |
| 4,586,596 | 5/1986 | Schmid | 192/106.2 |
| 5,045,027 | 9/1991 | Larsen | 464/63 |

FOREIGN PATENT DOCUMENTS

| | | |
|---|---|---|
| 1952620 | 6/1971 | Fed. Rep. of Germany . |
| 3616163 | 11/1986 | Fed. Rep. of Germany . |
| 4003076 | 8/1991 | Fed. Rep. of Germany ... 192/70.17 |
| 2305637 | 10/1976 | France . |
| 2351314 | 12/1977 | France . |
| 2526901 | 11/1983 | France . |
| 2551813 | 3/1985 | France . |
| 2570147 | 3/1986 | France . |
| 2667371 | 9/1990 | France . |
| 60-192123 | 9/1985 | Japan . |
| 4-69410 | 3/1992 | Japan . |
| 1251468 | 10/1971 | United Kingdom . |
| 2128272 | 4/1984 | United Kingdom ............. 192/70.17 |

Primary Examiner—Charles A. Marmor
Assistant Examiner—Andrea Pitts
Attorney, Agent, or Firm—Longacre & White

[57] ABSTRACT

A clutch has two friction wheels, a common hub, and a predamper, one of the friction wheels having an elongated hub with external teeth which mesh without clearance with teeth formed in the hub of the other friction wheel. The elongated hub is coupled in rotation to the common hub of the clutch through teeth which mesh after a circumferential clearance between them has been taken up. The predamper and the common hub together form a subassembly, and a retaining ring is located axially on the common hub so that the retaining ring and the predamper together retain the elongated hub on the common hub. The predamper is coupled in rotation to the elongated hub by an axially releasable mating coupling.

13 Claims, 3 Drawing Sheets

DAMPING DEVICE FOR A MULTIPLATE FRICTION CLUTCH

FIELD OF THE INVENTION

The present invention relates to a damping device for a multiplate friction clutch, that is to say a clutch having more than one clutch friction wheel carrying friction liner means adapted to be releasably gripped between two plates of the clutch. More particularly, the invention relates to a twin plate clutch for heavy goods vehicles, of the kind comprising: a first friction wheel and a second friction wheel which are coupled together in rotation by indexing or phasing means acting between the two friction wheels; a common hub; and, acting between the common hub and one of the friction wheels, firstly a loose coupling means in the form of cooperating sets of teeth defining a circumferential clearance between them, and secondly a predamper.

BACKGROUND OF THE INVENTION

Such a damping means is described in United Kingdom Patent Specification GB1251468A and the corresponding German Patent Specification DE1952620A, in which (as shown in FIG. 17 of that specification) the phasing means comprise pins or dowels acting between the hubs of the two friction wheels, with each of these pins engaging circumferentially, with a clearance, with the common hub.

The predamper has a cap which is force fitted onto an axial projection of the hub of one of the friction wheels. It is thus not possible to carry out any separate testing on the predamper, which is however necessary in some cases. In addition, one of the friction wheels is located axially on the common hub by means of a ring which is engaged in a groove machined in the teeth of the common hub. The machining of this groove can produce undesirable burrs.

All this complicates manufacture and increases the number of components.

It might be thought that an intermediate indexing ring could be used, meshing with a clearance, by means of teeth, with the common hub, and meshing without clearance with the hubs of the friction wheels. However, this requires a large number of broaching or milling, and machining operations, and imposes limitations on the size of the common hub.

DISCUSSION OF THE INVENTION

An object of the present invention is to provide a novel damping device which overcomes these drawbacks of the known arrangements, while enabling separate testing to be carried out on the predamper.

According to the invention, a damping device for a multiplate friction clutch comprising a first friction wheel and a second friction wheel, each having a hub and being coupled in rotation by indexing means acting between the two said friction wheels, a common hub, and, acting between the common hub and one of the friction wheels, firstly a loose coupling means in the form of teeth and secondly a predamper, is characterised: in that one of the friction wheels is provided with an axially elongated hub which is provided with external teeth for meshing without clearance with teeth provided internally on the hub of the other friction wheel; in that the said elongated hub is coupled in rotation to the common hub by the teeth of the said loose coupling means; in that the predamper and the common hub together form a sub-assembly, with the predamper being disposed outside the friction wheel having the elongated hub and on one side of the latter; in that a retaining ring is located axially on the common hub on the other side of the elongated hub; and in that the predamper is coupled in rotation to the elongated hub by an axially releasable mating coupling.

The invention makes it possible to text the sub-assembly consisting of the predamper and the common hub by itself, and the predamper, together with the retaining ring, enable the elongated hub to be easily located axially on the common hub.

The fitting of the other friction wheel is facilitated because this can be carried out by simply threading it onto the elongated hub. The sliding movement of this friction wheel is easy to achieve, due to the elongation of the hub of the other friction wheel. In this connection, the internal teeth of this hub may be made very long, for example to a length which is more than half the length of the internal teeth of the elongated hub. In this way, the corresponding friction wheel is released effectively during disengagement of the clutch.

In addition, the common hub is simple and its radial size is greater than that of an arrangement which includes a phasing or indexing ring. This makes it possible for the clutch to transmit an increased torque.

This arrangement involves a minimum number of broaching, milling and turning operations, and leads to excellent indexing without any risk of jamming of the two friction wheels. The predamper is able to act effectively. In addition, a simple and mechanically robust arrangement is obtained which has a minimum number of components. In this connection, the internal space delimited by the springs normally found in clutch friction wheels is used to the best advantage.

In addition, these friction wheels differ from each other only in respect of the design of their hubs, and this leads to improved standardisation.

According to another feature of the invention, the retaining ring is removable. This removable ring may consist of a discontinuous resilient ring or split ring, or, in a modification, this ring may have at its inner periphery a set of tabs or lugs for bayonet type fitting on the common hub. In all cases, it is possible to dismantle the assembly consisting of the common hub and the predamper in order to reduce the amount of interference that needs to be carried out on the clutch during reconditioning or recycling.

According to another feature of the invention, the predamper is attached to the elongated hub, to which it is coupled by the said mating coupling, the latter being formed in a radially enlarged portion of the elongated hub, which is thus enabled to be mechanically very robust.

The description of preferred embodiments of the invention given below is by way of example only and with reference to the accompanying drawings.

DESCRIPTION OF THE PREFERRED EMBODIMENT OF THE INVENTION

Figure 1:
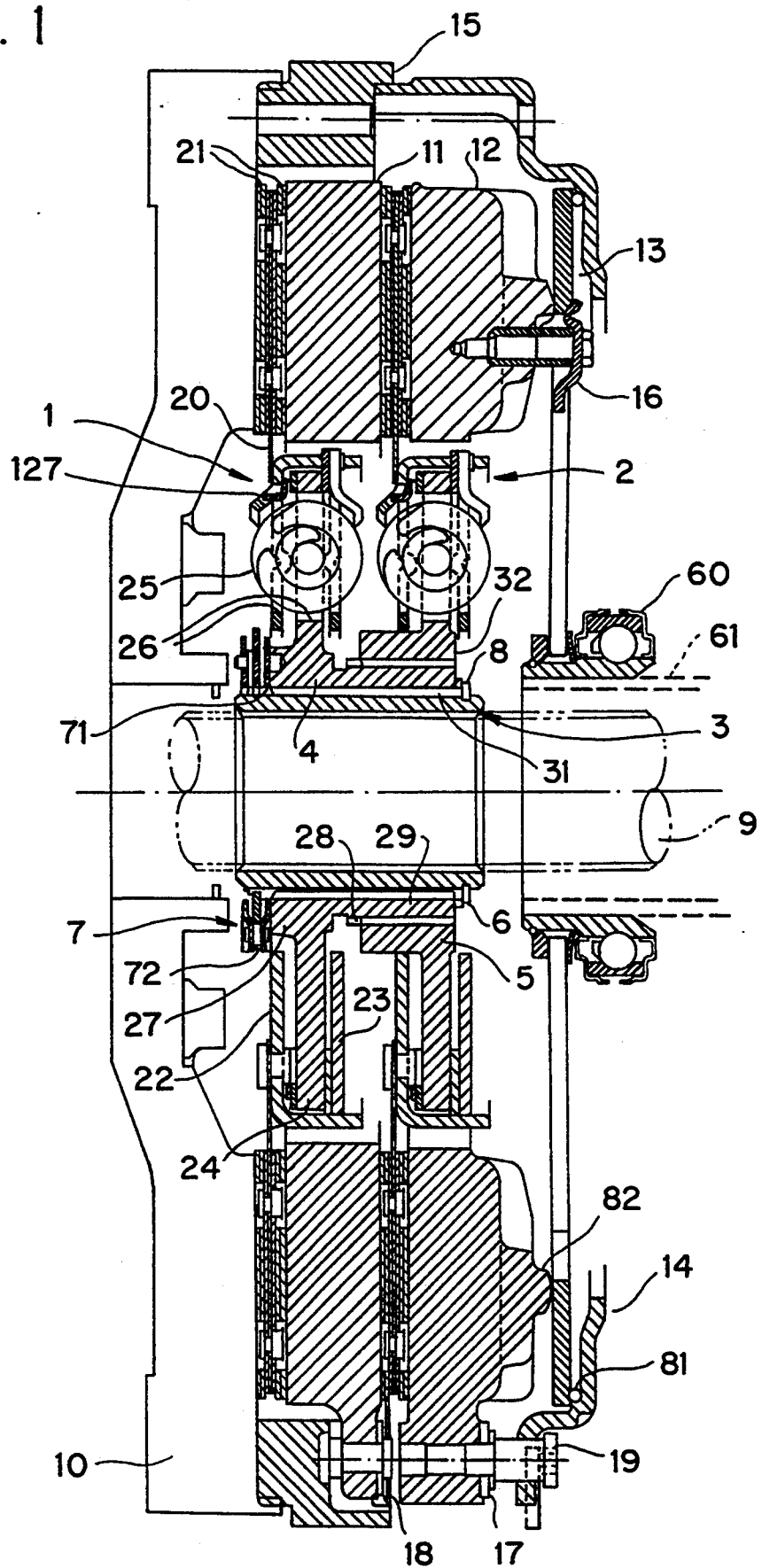
FIG. 1 is a view in axial cross section of a multi-plate clutch with a damping device in accordance with the invention.

The drawings show examples of the application of the invention to a twin-plate clutch for heavy goods vehicles. The clutch comprises generally a reaction plate 10 and a clutch mechanism which is suitably carried, in this case by means of screws, on the reaction plate 10, with a first clutch friction wheel 1 being inserted. The reaction plate 10 is fixed to the crankshaft of the engine of a heavy goods vehicle, for rotation with the crankshaft.

The clutch mechanism generally comprises a hollow annular cover plate 14 which constitutes a casing, together with two pressure plates 11 and 12 which are offset from each other axially within this casing. A second clutch friction wheel 2 is interposed between the two pressure plates 11 and 12 so as to be gripped between them. The pressure plate 12 is the one nearest to the cover plate 14. The first friction wheel 1, and the greater part of the first pressure plate 11, are surrounded by an annular spacing ring 15 which is interposed axially between the reaction plate 10 and the cover plate 14.

The cover plate 14 has a generally radial base portion which is open centrally, an axially oriented annular wall, a radial flange extending outwardly from the latter, and an axially oriented second wall projecting from the outer periphery of this flange. This axial second wall is in contact with the spacing ring 15. The cover plate 14 is secured to the reaction plate 10 by means of screws which pass through the radial flange of the cover plate 14 and through the spacing ring 15. The heads of these screws bear on the radial flange.

The cover plate 14 carries a fulcrum element 81, which in this example takes the form of a ring, while the second pressure plate 12 has a discontinuous annular ridge 82. A clutch diaphragm 13 is interposed between the radial base of the cover plate 14 and the adjacent pressure plate 12. The diaphragm 13 consists, in the usual way, of a set of radial fingers joined at their root to the generally annular outer peripheral portion of the diaphragm which defines a Belleville ring. The diaphragm 13 bears at the outer periphery of its Belleville ring portion on the fulcrum ring 18, while the inner periphery of the Belleville ring portion bears on the annular ridge 82 of the pressure plate 12. The diaphragm acts in the conventional way to cause the clutch wheel 1 to be gripped between the reaction plate 10 and pressure plate 11, and the clutch wheel 2 to be gripped between the pressure plates 11 and 12.

A clutch release bearing 60 is arranged to act in traction on the ends of the fingers of the diaphragm 13, so as to release the diaphragm from the pressure plate 12, and so to disengage the clutch. The clutch release bearing 60 is moveable along a guide tube 61 which is fixed to the gearbox of the vehicle, being actuated in the usual way by a declutching fork or a hydraulic piston (not shown).

The pressure plate 12 is coupled to the cover plate 14 so that they rotate together, but is moveable axially with respect to the cover plate by virtue of a set of resilient tangential tongues 17 which are fixed to the cover plate 14, and which cooperate with radial ears of the pressure plate 12. Similarly, the pressure plate 11 is also coupled to the cover plate 14 for rotation with the latter, and is again able to move axially with respect to the cover plate by virtue of resilient tangential tongues 18 fixed to the pressure plate 12 and cooperating with ears of the pressure plate 11. The tongues 17 are secured to the pressure plate 12 by means of screws 19, which limit the axial movement of the pressure plate 12 so as, in particular, to protect the tongues 18 against undue deflection. The tongues 18 are secured to the pressure plate 11 by riveting. Disengagement means 16 consisting of plates and screws act between the diaphragms 13 and the pressure plate 12 for disengagement of the latter.

Disengagement of the other pressure plate 11 is made possible by the tongues 18. For more details about these arrangements, reference is invited to the above mentioned U.S. Pat. No. 4,609,085 and the corresponding French Specification 2526901. The twin-plate clutch also includes a damping device which includes the friction wheels 1 and 2.

Each friction wheel 1, 2 includes a carrier disc 20 which carries friction liners 21 on both sides. The liners 21, which may be discontinuous, are fixed to the disc 20, in this example by riveting. The carrier disc 20 is fixed to a guide ring 22 which has an axially oriented flange at its outer periphery. The guide ring 22 is secured by interlocking engagement to another guide ring 23, which is formed with tenons for this purpose, while the outer flange of the guide ring 22 has corresponding mortices to receive the tenons. The axial outer flange of the outer guide ring 22 accordingly acts as a spacer between the two guide rings 22 and 23. The guide rings are arranged on either side of a hub plate, or damper plate, 24 which is encircled by this spacing flange. Each hub plate 24 is fixed to its associated hub 4 or 5, and in this example they are formed integrally with the latter. The guide rings 22 and 23 are moveable with respect to the hub 4 or 5.

A friction device 127 is arranged at the outer periphery of the guide ring 22. This friction device comprises a friction ring and an axially acting resilient ring inserted between the hub plate 24 and the guide ring 22, together with another friction ring between the hub plate 24 and the other guide ring 23. This last mentioned friction ring is biased by the axially acting resilient ring. In this example, the latter is in the form of a corrugated ring, having a number of corrugations equal to the number of resilient members in the friction wheel. The resilient ring also has indexing means in the form of tabs, each of which is in engagement with a corresponding hole in the guide ring 22. The friction ring lying between the hub plate 24 and the guide ring 22 centers the corrugated ring, and has at its inner periphery at least one radial slot, through which it is in engagement with one of the securing rivets of the carrier disc 20 of the clutch wheel 1. The other friction ring has at its outer periphery at least one tab through which it is in engagement with one of the slots or mortices formed in the axial outer flange of the guide ring 22.

The hub plate 24 is coupled to the guide rings 22 and 23 by means of circumferentially acting resilient means 25 which are mounted in windows 26 formed in fading relationship in the hub plate 24 and in the guide rings 22 and 23, in the usual way. In this example, these resilient means 25 are in the form of coil springs which are mounted in pairs in the windows 26.

Figure 2:
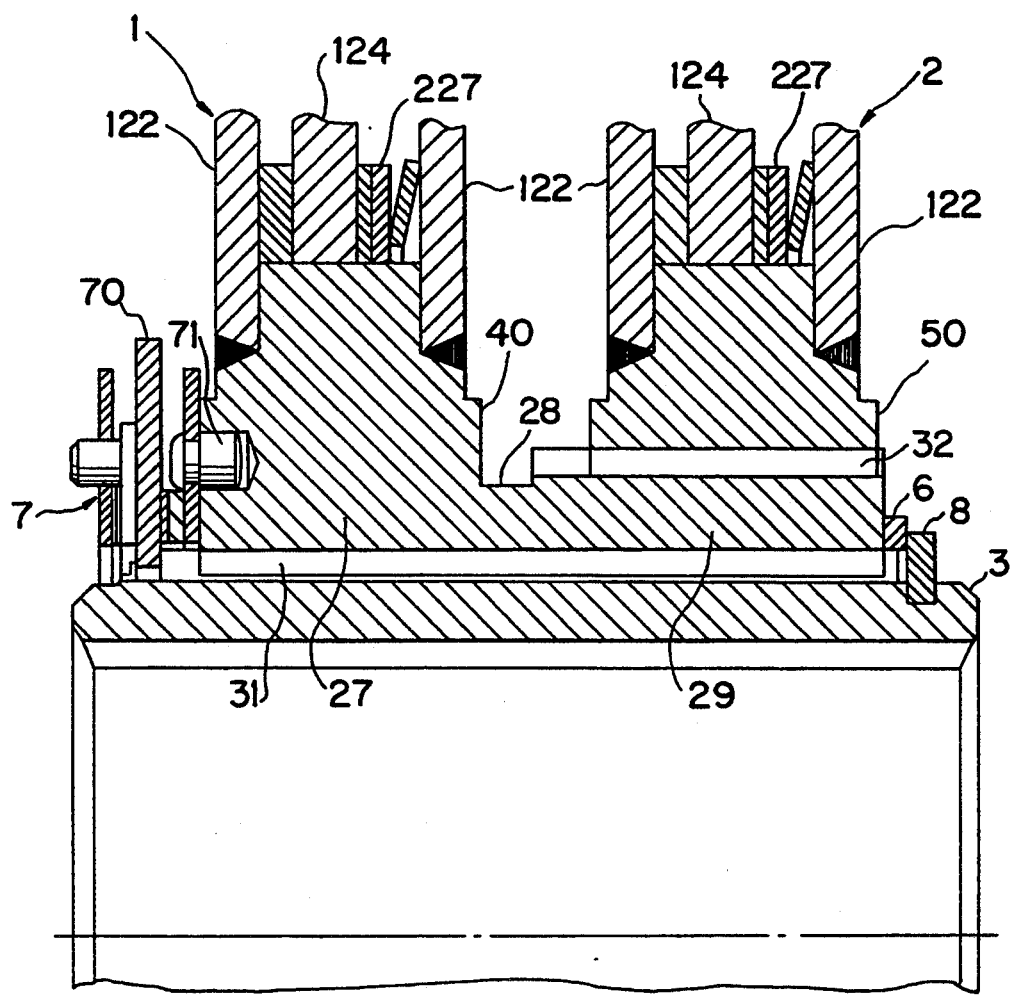
FIG. 2 is a view in axial cross section showing part of a damping device in accordance with the invention, in a second embodiment.

The damping device also includes a predamper 7, which is best seen in FIG. 2. The predamper 7 is constructed in the image of the friction wheels 1 and 2: accordingly, it includes a hub or damper plate 70 and two guide rings which are arranged on either side of the damper plate 70. These guide rings are coupled to the plate 70 by means of circumferentially acting resilient means of relatively low stiffness, which are fitted in windows arranged in facing relationship in the guide rings of the predamper and in the plate 70, with a friction means being interposed.

The damper plate 70 of the predamper 7 is formed with passages through which there pass a set of spacers 72 (see FIG. 3), which join the guide rings of the predamper together. These spacers are fitted in local fastening portions, formed on each of the guide rings in facing relationship to each other and offset towards the damper plate 70. This predamper is of the same type as that described in U.S. Pat. No. 4,688,666 and the corresponding French specification FR2570147A, and reference to those specifications is invited for further details.

The first friction wheel 1 and the second friction wheel 2 are coupled in rotation with a common hub 3, through loose coupling means in the form of sets of teeth. The common hub 3 has a splined internal bore which meshes with the input shaft 9 of the gearbox. The shaft 9 is indicated diagrammatically in FIG. 1.

The friction wheel 1 includes the hub 4 and the friction wheel 2 includes the hub 5. One of the friction wheels meshes loosely (i.e. with a clearance) with the common hub 3, which is surrounded by both of the hubs 4 and 5. One of the latter, in this case the hub 4 of the friction wheel 1, is elongated axially by an extension portion 29 formed with external teeth, which mesh without any clearance with internal teeth of the hub 5 of the other friction wheel 2. The elongated hub 4 is coupled in rotation to the common hub 3 through the teeth of the loose coupling means, indicated at 31 in FIGS. 1 and 2, whereby the friction wheel 1 is loosely coupled (i.e. with a circumferential clearance) to the common hub 3. The predamper 7 and the common hub 3 together form a subassembly, with the predamper being disposed on the outside of the friction wheel 1 having the elongated hub 4, and on a first side of the latter. This subassembly also includes a retaining ring 8, which is located axially on the common hub 3 on the other side of the friction wheel 1 which has the elongated hub. The predamper 7 is coupled in rotation to the elongated hub 4 through a mating coupling 71 which is releasable axially.

In the present example, it is the friction wheel 1, the friction liners 21 of which are arranged to be gripped between the reaction plate 10 and the first pressure plate 11, that has the elongated hub 4. Its clutch plate 24 is integral with the axially elongated hub 4. The hub plate of the second friction wheel 2 has an inverted L-shaped cross section, which defines the hub 5 at its inner periphery, so that the hub 5 is integral with the hub plate. In this way, the hubs 4 and 5 are mounted in head-to-toe relationship one on the other (see FIG. 1), with the hub 5 surrounding the axially elongated portion 29 of the hub 4.

Figure 4:
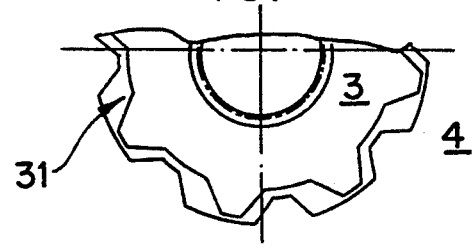
FIG. 4 is a diagrammatic half view showing the loose coupling means between the hubs of the friction wheels.

The loose coupling means 31 comprise splines on the internal surface of the hub 4 and splines on the outer surface of the common hub 3, these splines being of the trapezoidal shape shown in FIG. 4, from which can be seen the above mentioned circumferential clearance between the splines of the hub 4 and those of the hub 3. The hub 3 is tubular, and its splines, which constitute a set of teeth, are slightly longer than those of the hub 4.

Figure 5:
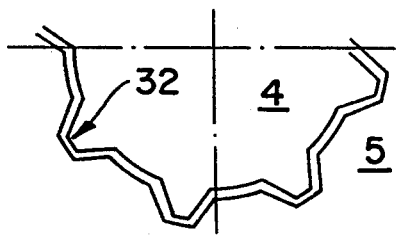
FIG. 5 is a diagrammatic half view showing the toothed coupling between the hubs of the friction wheels.

By contrast, the coupling 32, shown in FIG. 5, between the two hubs 4 and 5 does not have this circumferential clearance. The coupling 32 comprises splines on the internal surface of the hub 5, cooperating with splines on the outer surface of the hub 4, and more particularly on the elongated portion 29 of the latter. The splines of the coupling 32 in FIG. 5 are of substantially identical cross section to those of the loose coupling means 31 in FIG. 4, apart from the difference in dimensions which give the circumferential clearance in the loose coupling means 31. It will be appreciated that the length of the external splines of the elongated hub is greater than one half of the length of the internal splines of the hub 5. Thus, the hub 5 is easily able to slide axially along splines which have a large axial length, which facilitates its release between the pressure plates 11 and 12 during disengagement of the clutch.

As will be understood from the foregoing, the number of machining operatives, e.g. broaching, milling or cutting operations, required for forming the splines is limited, and comprises three operations to form the internal splines and two operations to form the external splines, of the hubs 3, 4 and 5 respectively.

The hub plate 24 is joined integrally go the hub 4 through a thickened coupling portion 27, i.e. a zone which is extended radially, of the hub 4. The guide rings 22 and 23 of the clutch wheel 1 surround its hub 4. The guide rings of the clutch wheel 2 are identical with the rings 22 and 23.

It will be appreciated that the arrangement of the friction device 127 at the outer periphery of the guide rings 22 and 23, and at the level of the springs 25, makes space available radially within the envelope bounded by the springs 25. In this way the hubs 3, 4 and 5 are able to be made radially thick enough to give them a high degree of mechanical strength, while the guide rings 22 and 23 are shortened in the radial direction.

The predamper 7 is carried on, and secured to, the common hub 3. In this example it is secured by insertion in the manner described in French Patent specification FR2570147A, though in a modification it may be welded to one of the ends of the external splines of the hub 3, these being preferably continuous. The retaining ring 8 is lodged in a groove formed on the hub 3 beyond the other end of its splines. As can be seen, the predamper 7 and the ring 8 together locate the hub 4 axially on the hub 3. In this connection, it will be noted that the damper plate 70 of the predamper acts as another retaining ring, cooperating with the ring 8.

The predamper 7 is coupled to the hub 4 on the side of the latter which faces towards the reaction plate 10, by the above mentioned mating coupling 71. The latter acts between the predamper 7 and the hub 4, and comprises at least one pin, and in practice several pins spaced apart circumferentially.

These extend parallel to the axis of the assembly, and each pin is individually engaged in a respective one of a number of complementary holes provided for this purpose in the coupling portion 27 of the hub 4. The coupling is thus releasable axially. The pins and their associated holes (which in this example are blind holes) are here of cylindrical form, and are generally arranged on the same pitch circle as the outer teeth of the hub 4. The radial thickness of the coupling portion 27 can however be increased if desired, with the mating coupling 71 being arranged on a larger pitch circle than the outer teeth of the hub 4.

The outer teeth (or splines) of hub 4 are separated from the coupling portion 27 by a circumferential groove 28. The hub 4, constructed as described, is both mechanically robust and simple in design, combining radial enlargement of its coupling portion 27 with substantial length of its external teeth. In addition, the enlarged portion 27, at one end of the elongated hub, is separated by the groove 28 from the external teeth (splines), these being formed in its tubular extension portion 29. The groove 28 facilitates machining of the external splines of the hub 4, and also collects any foreign matter, including particles or other matter resulting from the sliding movement of the hub 5 on the hub 4. This reduces any risks of jamming when the clutch is in use.

In this example, the retaining ring 8 is a resilient ring, of the discontinuous kind having a break; and a spacer ring 6 is fitted between the retaining ring and the hub 4 to prevent any accidental opening of the ring 8 during the relative angular displacement between the hubs 3 and 4. The spacing ring 6 is mounted on the hub 3 so as to be rotatable with the latter. In this example, it engages with the external splines of the hub 3.

A subassembly is thus formed which consists of the common hub 3 and the predamper 7. This subassembly is then fitted simply by inserting the hub 3 in the hub 4, oriented so that the pins of the predamper 7 penetrate into the corresponding holes in the coupling portion 27 of the hub 4; the spacer ring, and then the retaining ring 8, are then fitted on the hub 3. This arrangement thus makes it possible to test the hub 3 and the predamper 7 separately from the remainder of the clutch when required.

The friction wheel 2 can also be fitted easily, by threading it onto the hub 4 of the friction wheel 1, after the latter has been fitted to the first subassembly (hub 3 and predamper 7) as described above, in order to form a second subassembly. It can be seen that there are thus three successive subassemblies, each characterised by a robust and simple hub, 3, 4 and 5 respectively.

At this stage it is worth recalling how the damping device works. In a first stage of its operation, the friction wheels 1 and 2 behave like rigid elements, since the springs 25 have an overall stiffness which is greater than that of the resilient members of the predamper 7. This first stage is continued until the clearance between the teeth of the hub 3 and those of the hub 4 is taken up. Once this happens, the predamper remains in its compressed state, since the springs 25 and the friction device 127 are exerting their applied forces.

In every case, the coupling 32 between the hubs of the two friction wheels indexes these latter with respect to each other so that there is no disturbance to the operation of the predamper 7.

The present invention is of course not limited to the embodiment described above. In particular, the structures may be reversed, with the friction wheel 1 then being engaged through its hub on the elongated hub of the friction wheel 2, this latter hub having the enlarged portion 27, with the predamper 7 being fitted at the same end of the clutch as the clutch release bearing 60, i.e. being attached to the friction wheel 2 furthest away from the reaction plate 10. It must however be mentioned that this position of the predamper is less satisfactory. In this connection, during fitting of the clutch release bearing 60 on the fingers of the. diaphragm 30, if this is effected by clipping which requires an overtravel of the clutch release bearing, there may be interference between the release bearing 60 and the predamper 7 if special precautions are not taken to maintain some distance separating the predamper from the clutch release bearing.

FIG. 2 illustrates another possible modification, similar to that described in German Patent specification DE1952620A. This consists in the provision of guide rings 122 which are fixed to the hubs, 50 and 40 respectively, of the friction wheels 1 and 2; while the damper plate, 124, of each friction wheel is rotatable on the associated hub 40 or 50 respectively, and carries the associated carrier disc 20.

In this arrangement, the guide rings 122, which are identical to each other, are preferably fixed to a hub flange of the associated hub 40 or 50, by welding which is effected between the inner periphery of each guide ring and the corresponding surface of the hub flange. Through its flange, the hub 50 slides along the axial extension portion 29 of the hub 40, in the same way as in the arrangement shown in FIG. 1.

In another modification, the guide rings may be secured to the associated hub flanges by insertion effected between the inner periphery of each guide ring and an associated surface of the flange. In all cases, the predamper 7 is carried by the elongated hub adjacent to the radially extended portion 27 of the latter.

It will be appreciated that the arrangement shown in FIG. 2 enables the springs 25 to be positioned, with no increase in radial size, in such a way that space is made available radially inward of these springs to locate the friction device (indicated at 227 in FIG. 2) radially inward of the springs 25. The friction device 227 acts like the corresponding device 127 in FIG. 1, axially between the guide rings 122 and the hub damper plate 124.

In a further modification, the predamper may be made of a suitable plastics material, and may for example be of the type described in French Patent specification FR2611245A, with its central hub being located axially on the common hub 3 by suitable means such as a circlip.

In a further modification, the retaining ring 8 may be secured on the common hub 3 by upsetting of material, or may itself consist of an upset portion of the hub.

Figure 3:
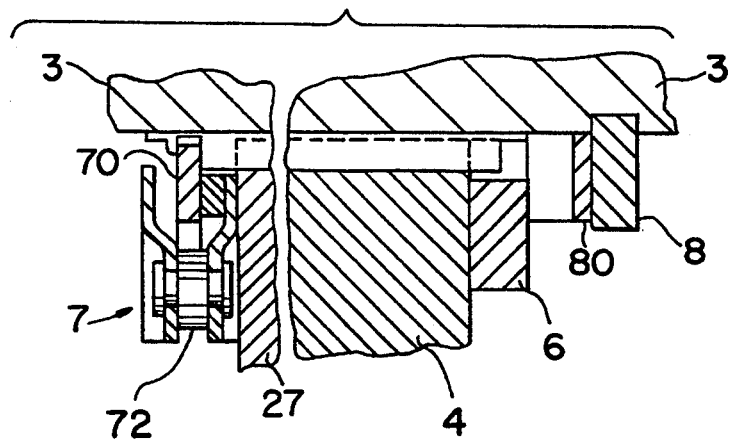
FIG. 3 is a scrap view of the inner periphery of the damping device shown in FIG. 1, but in a modified form.

Referring again to FIG. 3, a preferred arrangement is to interpose an axially acting resilient ring 80 between the retaining ring 8 and the spacer ring 6. In this example this ring 80 is of the corrugated type. In this case, the predamper is simplified, with the resilient ring, normally provided between the damper plate 70 and the guide ring which carries the pins of the coupling 71, being omitted. The same is also true of the friction ring provided between the damper plate 70 of the predamper and its other guide ring, as seen in FIG. 3. In this case, the predamper has only one friction ring, interposed axially between its damper plate 70 and the ring which is coupled to the hub 5.

It will be appreciated that in all cases, the only difference between the two friction wheels 1 and 2 lies in their hubs, and that the best possible use is made of the space available at the inner periphery of the guide rings.

The structure of the mating coupling 71 may also be reversed, with the coupling portion 27 being provided with pins releasably engaging corresponding holes formed in the adjacent guide ring of the predamper.

If necessary, it is possible to elongate the hub 5 or 50 axially, so that its length is then greater than one half of the length of the other hub 4 or 40.

Figure 6:
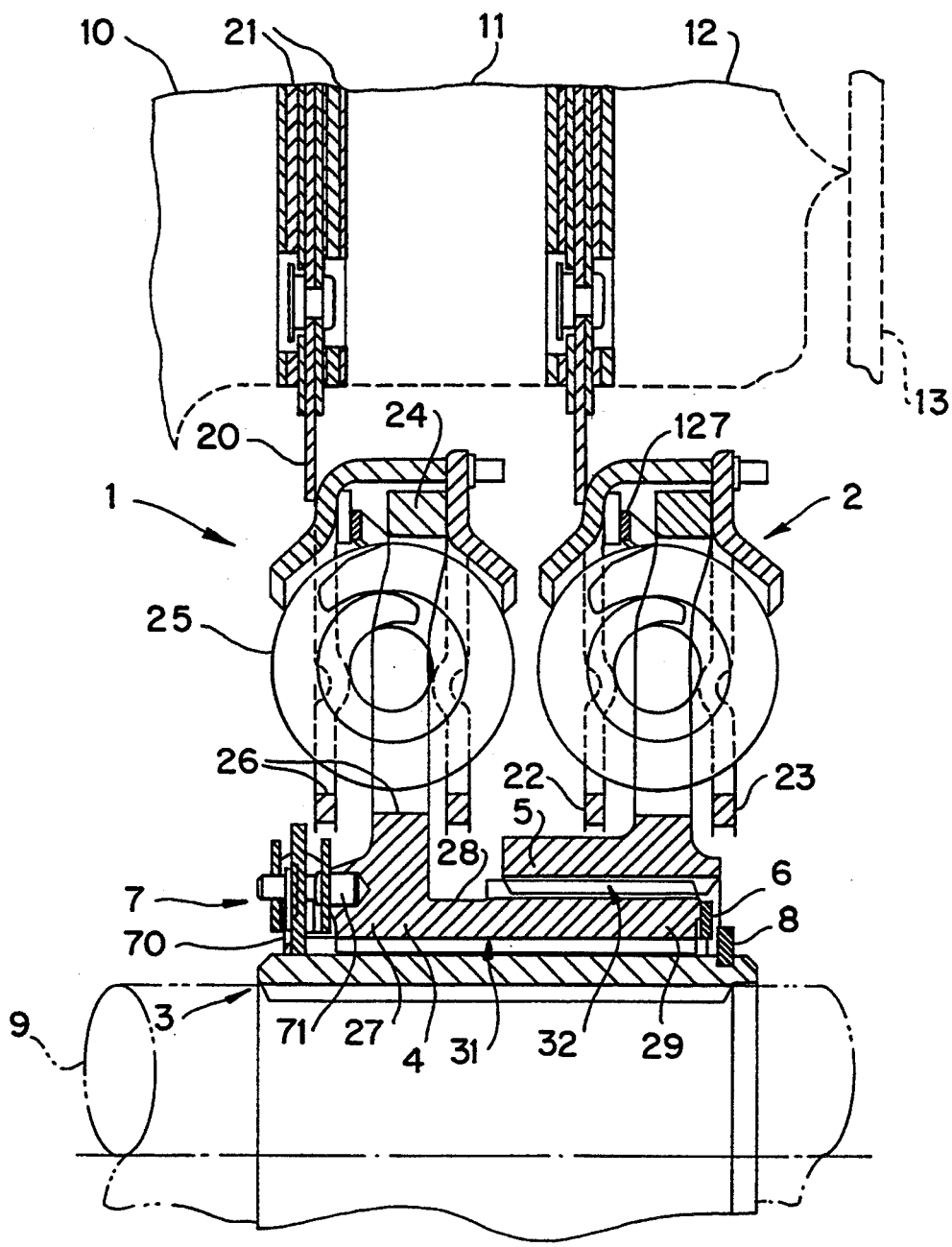
FIG. 6 is a view similar to part of FIG. 1, but shows a further embodiment of the invention.

Reference is now made to FIG. 6, showing another embodiment of the invention in which the internal teeth of the hub 5 of the second friction wheel 2 extend axially, at the free end furthest away from the friction wheel 1, beyond the external teeth of the elongated hub 4. At the other end of the hub 5, i.e. the end closer to the friction wheel 1, the external teeth of the elongated hub 4 correspondingly extend beyond the cooperating teeth of the hub 5. This enables good sliding movement of the hub 5 of the second friction wheel on the hub 4 of the first friction wheel to be ensured, in spite of any effects of wear or impact that may take place between the two cooperating sets of teeth. In this connection, wear in the external teeth of the elongated hub 4 can give rise to deformations at the free end of the latter, with these deformations forming corners or recesses. With the modification shown in FIG. 6 and just described, the hub 5, in spite of the formation of such corners, will escape from the elongated hub during release of the second friction wheel when the clutch is being disengaged.

Similarly, deformations of material, formed by the internal teeth of the hub 5 in the external teeth of the hub 4 in the region of its axial end closest to the first friction wheel 1, will have no detrimental effect on the sliding movement of the second friction wheel 2. In addition, the diaphragm displaces these deformations as the result of wear in the friction liners 21. In this connection, when the friction liners 21 of the second friction wheel 2 become worn, this friction wheel can move axially closer to the first friction wheel 1 without any problems arising, since it is then subject to the forges exerted by the diaphragm via the pressure plate 12, which will always urge the friction wheel 2 towards the first friction wheel 1 regardless of any wear effects. The deformation that may occur in the teeth of the hub 4 will be displaced towards the friction wheel 1, the main part of these teeth preserving their correct geometry.

Similarly, deformations occurring in the region of the free end of the hub 5 of the second friction wheel will have no detrimental effect on the manoeuvre of re-engaging the clutch, since the diaphragm will exert its thrust on the second friction wheel, which will slide without any problem, while the major part of the external teeth of the hub 5 will retain its correct geometry.

Thus, the hub 5 preferably has internal teeth which are offset away from the first friction wheel 1 with respect to the external teeth of the elongated hub 4.

Finally, it will be noted that in FIG. 6, the hub plate 24 is in direct frictional engagement against the guide ring 23.

What is claimed is:

1. A multi-plate friction clutch comprising: a first friction wheel having a first hub; a second friction wheel having a second hub, said friction wheels defining indexing means coupling them in rotation together; a common third hub having first teeth, with one of the friction wheels having second teeth cooperating with said first teeth and defining therewith a loose coupling means coupling the third hub to said one of the friction wheels; and a predamper operatively interposed between the third hub and the friction wheels, wherein one of said first and second hubs is elongated axially by an extension portion having third teeth formed externally thereon, the other one of said second and first hubs having internal fourth teeth meshing with the third teeth so as to define, with the third teeth, said indexing means, the elongated hub having said second teeth internally thereof whereby to be coupled directly to the third hub, the predamper and the third hub together constituting a sub-assembly with the predamper arranged on a side of the friction wheel having the elongated hub opposite the other friction wheel, at a first end of the third hub, the clutch further including a retaining ring located axially on the third hub proximate a second end of the elongated hub, and means on the elongated hub and predamper defining an axially releasable mating coupling between the predamper and the elongated hub.

2. A clutch according to claim 1, wherein the elongated hub has a radially enlarged coupling portion defining the said mating coupling with the predamper.

3. A clutch according to claim 2, wherein the mating coupling comprises at least one pin carried by one of the elements comprising the predamper and the said coupling portion and extending parallel to an axis of the clutch, the other one of the said elements defining a corresponding number of complementary recesses for removably receiving a corresponding said pin.

4. A clutch according to claim 2, wherein the said third teeth are splines defining a pitch circle, the said mating coupling being arranged on the same pitch circle.

5. A clutch according to claim 2, wherein the said radially enlarged portion of the elongated hub is at an end of the latter remote from the extension portion of the hub, the said third teeth on the latter being in the form of splines and the said extension portion being tubular, with the elongated hub defining a groove separating the said radially enlarged portion and extension portion from each other.

6. A clutch according to claim 1, wherein the said retaining ring is a resilient discontinuous retaining ring, the clutch further including a spacer between the retaining ring and the elongated hub, the spacer being mounted on the third hub for rotation with the latter.

7. A clutch according to claim 6, further including an axially acting resilient ring interposed axially between the retaining ring and the said spacer.

8. A clutch according to claim 1, wherein the said first and second teeth are splines, the said third and fourth teeth also being splines, the splines constituting the said third teeth having a first length greater than one half of the length of the said second a second teeth, the latter being formed internally of the elongated hub.

9. A clutch according to claim 8, wherein each friction means further includes a hub plate joined to its hub, a pair of guide rings disposed on either side of the hub plate, a carrier disc, for carrying friction liner means, fixed to each of said guide rings, resilient means coupling the hub plate to the guide rings, and friction means coupling the hub plate to the guide rings, the friction means being arranged at an outer periphery of the guide rings.

10. A clutch according to claim 8, wherein each friction wheel has a radial plate mounted around its hub and rotatable with respect thereto, a carrier disc for carrying friction liner means, fixed to the said radial plate, a plurality of guide rings, and resilient means coupling the said guide rings to the said radial plate, the hub having a radial flange defining a surface, each guide ring having an internal peripheral edge joined to the said surface of the hub flange so as to secure the guide rings to the hub, the friction wheel further including friction means disposed radially inward of the said resilient members and interposed between the guide rings and the damper plate.

11. A clutch according to claim 2, further including a reaction plate cooperating with the first friction wheel having the first hub, the latter being the elongated hub to which the predamper is attached.

12. A clutch according to claim 1, wherein the elongated hub is the first hub, the said third teeth thereof defining a free end of the extension portion of the hub, the said fourth teeth formed on the second hub of the second friction wheel projecting axially with respect to the said free end.

13. A clutch according to claim 12, wherein the internal teeth of the second hub, constituting said fourth teeth, define an axial end thereof proximal to the first friction wheel but axially further away from the latter than a corresponding axial end of the said third teeth formed externally on the elongated hub.

* * * * *